(12) United States Patent
Schmidt

(10) Patent No.: US 8,059,382 B2
(45) Date of Patent: Nov. 15, 2011

(54) INTRINSICALLY SAFE CIRCUIT FOR DRIVING A SOLENOID VALVE AT LOW POWER

(75) Inventor: Glen Eugene Schmidt, Bartlesville, OK (US)

(73) Assignee: Siemens Industry, Inc., Alpharetta, GA (US)

( * ) Notice: Subject to any disclaimer, the term of this patent is extended or adjusted under 35 U.S.C. 154(b) by 277 days.

(21) Appl. No.: 12/423,087

(22) Filed: Apr. 14, 2009

(65) Prior Publication Data

US 2009/0323247 A1 Dec. 31, 2009

Related U.S. Application Data

(60) Provisional application No. 61/104,767, filed on Apr. 25, 2008.

(51) Int. Cl.
*H01H 9/00* (2006.01)
*H01H 47/00* (2006.01)
*H01H 51/22* (2006.01)
*H01H 51/30* (2006.01)
*F16K 31/02* (2006.01)

(52) U.S. Cl. ............... 361/160; 361/156; 251/129.04

(58) Field of Classification Search ............ 361/160, 361/156

See application file for complete search history.

(56) References Cited

U.S. PATENT DOCUMENTS

| 5,490,031 | A | | 2/1996 | Braun et al. |
| 5,621,603 | A | | 4/1997 | Adamec et al. |
| 5,703,748 | A | | 12/1997 | Fulks et al. |
| 5,748,431 | A | | 5/1998 | Goodnight et al. |
| 5,838,589 | A | * | 11/1998 | Nail et al. ............ 700/286 |
| 6,256,185 | B1 | | 7/2001 | Maller |
| 6,636,022 | B2 | * | 10/2003 | Sluijs ............ 323/222 |
| 7,823,860 | B2 | * | 11/2010 | Ueda ............ 251/129.04 |
| 7,898,786 | B2 | * | 3/2011 | Schmidt ............ 361/119 |

* cited by examiner

*Primary Examiner* — Jared Fureman
*Assistant Examiner* — Lucy Thomas

(57) ABSTRACT

A system and method for providing an intrinsically safe (IS) circuit for driving a solenoid valve at a low power is disclosed. A voltage source generates a first voltage and is connected to a first side of the solenoid valve. A voltage inverter is connected to the voltage source and generates a second voltage from the first voltage. The second voltage is of opposite magnitude to the first voltage. A controller selectively controls the first voltage and the second voltage to be applied to the solenoid valve. In order to actuate the solenoid valve, the first voltage is applied to the first side of the solenoid valve and the second voltage is applied to the second side of the solenoid valve. In order to hold the solenoid valve in an on position, the first voltage is maintained and the second voltage is no longer applied to the second side of the solenoid valve. This circuit utilizes a reduced voltage, which allows the use of capacitance high enough to effectively drive a solenoid valve while still being compliant with IS standards due to a common, lower voltage magnitude. Also, this circuit allows for higher power solenoids to comply with IS standards. Further, this circuit is certifiable as IS without complex and expensive testing procedures.

22 Claims, 4 Drawing Sheets

INTRINSICALLY SAFE CIRCUIT FOR DRIVING A SOLENOID VALVE AT LOW POWER

This application claims the benefit of U.S. Provisional Application No. 61/046,001, filed Apr. 18, 2008, U.S. Provisional Application No. 61,046,076, filed Apr. 18, 2008, and U.S. Provisional Application No. 61,104,767, filed Apr. 25, 2008, the disclosures of which are herein incorporated by reference.

BACKGROUND OF THE INVENTION

The present invention relates to driving a solenoid valve at a low power, and more particularly to an apparatus and method for driving a solenoid valve at low power that is certifiable as intrinsically safe.

A solenoid valve is an electromechanical device commonly used to control the flow of gas or liquid by running an electric current through a solenoid, which is a magnetic coil. It is well known that a solenoid, or any electromechanical device with a magnetic coil, may be actuated at a higher voltage (power) and the voltage can be reduced to a lower voltage to "hold" the solenoid in the "on" position. The higher voltage overcomes inertia to start the movement of the solenoid, and the reduction to the lower voltage reduces power consumption in driving the solenoid.

Reducing power consumption is very desirable, particularly for circuits used to drive a solenoid valve in a process instrument sample system. However, the challenge that arises for process instrumentation is that such a circuit to drive a solenoid must use a protection technique that is suitable for the hazardous area in which it is present. Due to the difficulty of wiring to explosion-proof mechanically protected equipment, Intrinsically Safe (IS) circuits are desirable. Intrinsic safety is a protection concept deployed in sensitive or potentially explosive atmospheres. Intrinsic safety relies on equipment designed so that it is unable to release sufficient energy, by either thermal or electrical means, to contribute to conditions that are favorable for ignition of a flammable gas. There are various IS standards set forth by various certifying agencies for a system to be considered IS. Such standards include International Electrical Commission (IEC) IEC 60079-11, Factory Mutual (FM) 3610, Underwriters Laboratories (UL) UL913, etc.

Conventional circuit designs for driving a solenoid typically utilize multiple voltages, which makes such circuits difficult to certify as IS by analysis based on an IS standard. In such cases, certifying agencies must perform tests on the circuit designs using actual explosive mixtures of gases, and producing sparks with faults introduced into the circuit. Such testing is much more costly and time consuming than proving an IS design by straightforward analysis. Further, such testing leads to inefficient "trial and error" design/test cycles because it is difficult for a designer to anticipate whether the circuit design will be accepted to be IS by the certifying agency. This testing approach also makes it much more difficult to modify or iterate the design without re-test. Also, for some solenoid valves, if the inertial energy requirements to actuate the solenoid valves are high, it may not be possible for conventional circuit designs to comply to IS standards.

BRIEF SUMMARY OF THE INVENTION

The present invention relates to driving a solenoid valve at a low power using an apparatus that is certifiable as intrinsically safe (IS). Embodiments of the present invention provide a circuit that utilizes a reduced voltage, which allows the use of capacitance and voltage across a solenoid that is high enough to deliver enough energy to effectively overcome the effects of inertia and actuate a solenoid valve, while still being compliant with IS standards. Further, embodiments of the present invention provide a circuit that is certifiable as IS without complex and expensive testing procedures.

In one embodiment of the present invention, a voltage source generates a first voltage and is connected to a first side of a solenoid valve. A voltage inverter is connected to the voltage source and generates a second voltage from the first voltage. The second voltage is of opposite magnitude to the first voltage. A controller selectively controls the first voltage and the second voltage to be applied to the solenoid valve. In order to actuate the solenoid valve, the first voltage is applied to the first side of the solenoid valve and the second voltage is applied to the second side of the solenoid valve. In order to hold the solenoid valve in an on position, the first voltage is maintained and the second voltage is no longer applied to the second side of the solenoid valve, with the second side of the solenoid instead directed to ground potential with respect to the first voltage.

These and other advantages of the invention will be apparent to those of ordinary skill in the art by reference to the following detailed description and the accompanying drawings.

DETAILED DESCRIPTION

The present invention relates to driving a solenoid valve at a low power. Embodiments of the present invention provide an apparatus for driving a solenoid at a low power that is certifiable as intrinsically safe (IS).

Figure 1:
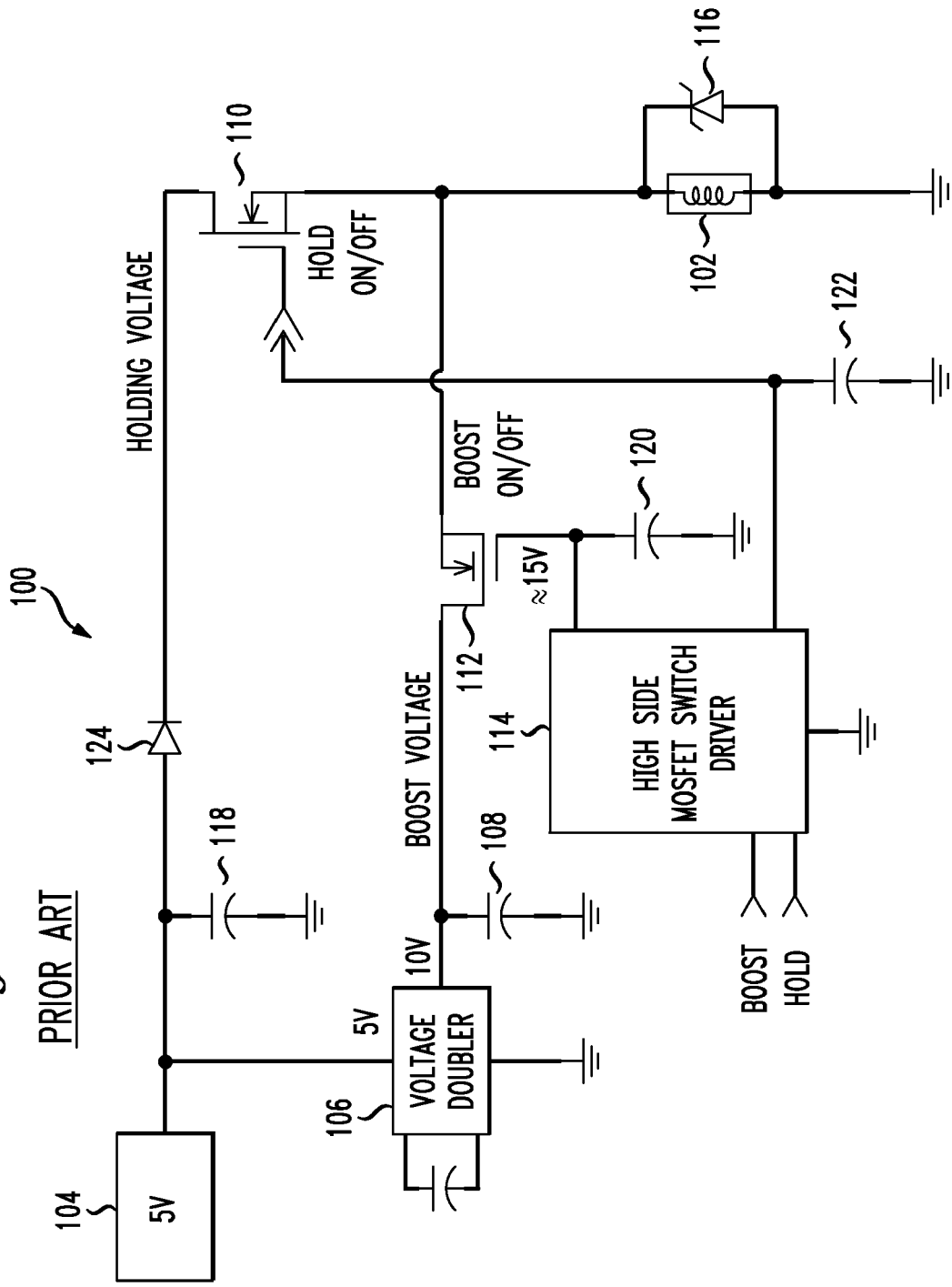
FIG. 1 illustrates a conventional circuit for driving a solenoid valve.

It is well known that a solenoid, or any electromechanical device with a magnetic coil, may be actuated at a higher power and then held in place in a static on position with a lower power after the inertia of movement has been overcome. FIG. 1 illustrates a conventional circuit for driving a solenoid valve. It is to be understood that the functions various circuit elements, such as capacitors, diodes, etc., shown in FIG. 1 are well known to those skilled in the art and will not be described herein in detail. As illustrated in FIG. 1, circuit 100 includes a solenoid valve 102. A zener diode 116 is connected in parallel with the solenoid valve 102 in order to protect the solenoid valve 102 by suppressing over-voltages applied to the solenoid valve 102. Although zener diode 116 is shown in FIG. 1, it is to be understood that an ordinary diode of sufficient voltage and current rating can be used in place of zener diode 116. In this example, circuit 100 uses a 5V voltage source 104 as a primary voltage supply. Capacitor 118 stores voltage generated by voltage source 104. A voltage doubler circuit 106 doubles the 5V to generate a 10V potential, which is stored in capacitor 108. For example, the voltage doubler circuit 106 can be implemented using an LTC1144, or other well known devices. Transistors 110 and 112 are used to selectively apply the holding voltage (5V) from voltage source 104 and the boost voltage (10V) from the voltage doubler 106 to the solenoid valve 102. In order to control the solenoid valve 102 with minimum loss, the transistor gates of transistor 112 must be driven at several volts greater than the 10V that is being supplied from the voltage doubler 106 in order to minimize loss in transistor 112. Therefore, a high side mosfet driver 114, such as a monolithic integrated circuit (IC), is used to generate an even higher potential of approximately 15V when the solenoid valve 102 is actuated.

In order to actuate the solenoid valve 102, in response to a boost control signal, the mosfet driver 114 applies the 15V to transistor 112 to turn on transistor 112, thus applying the boost voltage of 10V to the solenoid valve 102. During this time, there is a 10V potential at the source of transistor 110. The diode 124 prevents current from the higher potential 10V at the source of transistor 110 back to the lower potential 5V supply 104 through the parasitic reverse diode of transistor 110. This is due to the fact that a mosfet transistor is well known to have a parasitic diode between the source and drain when the voltage is reversed from the normal polarity across the drain and source. Without the blocking action of diode 124, the transistor would provide an undesirable current path from the 10V coil voltage to the 5V source voltage, thus rendering the boost circuit as ineffective. A short time after the boost voltage of 10V is applied, once the solenoid has overcome inertia, the 10V boost voltage is removed by shutting off the drive to transistor 112. At the same time as transistor 112 is turned on, or any time before transistor 112 is shut off, in response to a hold voltage signal, the mosfet driver 114 turns on transistor 110 in order to apply the hold voltage of 5V to the solenoid valve 102. The 5V hold voltage is sufficient to supply enough energy to hold the solenoid valve 102 in a steady state "on" position. Accordingly, by removing the 10V boost voltage and using the 5V hold voltage to keep the solenoid valve 102 in the on position, the steady state power requirements of circuit 100 are reduced. Capacitors 120 and 122 are supplementary to the implementation of the high side mosfet switch driver 114, as they store the boosted 15V gate drive voltage for each transistor 112 and 110, respectively.

The reduction of voltage in driving the solenoid valve poses a significant power advantage because half of the voltage may correlate to a quarter of the power. In the case of process instrument sample system control, the cost benefit can typically be $300-$400 per watt of power capacity for an installed system. Accordingly, driving a solenoid with the lowest possible power is desirable.

The challenge that arises for designers of process instrumentation is that such devices are often required to be intrinsically safe (IS) due to their presence in a hazardous area. As described above, there are various IS standards set forth by various certifying agencies for a system to be considered IS. Such standards include International Electrical Commission (IEC) IEC 60079-11, Factory Mutual (FM) 3610, Underwriters Laboratories (UL) UL913, etc. The most commonly cited safety standard, IEC 60079-11, would require a designer to limit the total stored energy in an IS circuit such that, in the case of circuit 100 of FIG. 1, all voltages associated with all capacitances must be evaluated as potential energy discharge sources that could lead to conditions for ignition while exposed to certain gaseous mixtures. In making a circuit IS, a designer seeks to eliminate any such potential of ignition. As long as only one voltage is involved, it is possible to determine by established curves and tables in IEC 60079-11 whether the capacitance and voltage values are low enough to ensure that the circuit is "safe". Since a capacitor is considered an energy storage device, the voltage has a significant factor on the amount of capacitance that is allowed in an IS circuit. For example, Table 1 below shows approximate capacitance limits for different voltage levels based on an interpretation of curves in the IEC 60079-11 standard.

TABLE 1

| IEC60079-11 FIG. A.3 Group II Capacitance Curve Data | |
|---|---|
| Voltage | Capacitance (approximate limit) |
| 15 volts | <1 micro-farad |
| 10 volts | <10 micro-farad |
| 5 volts | asymptotic curve to 1000 uf or more |

As illustrated in Table 1, while the ratio between 15V and 10V is 1.5, the allowed capacitance is ten times greater for 10V than for 15V. Further, while 5V is one-half of 10V, the allowed capacitance for 5V may be interpreted to be orders of magnitude higher than the allowed capacitance for 10V. Therefore, where large amounts of capacitance are required in IS circuitry, lower voltages are highly advantageous.

The capacitance used in the circuit of FIG. 1 is typically not a small value when evaluated for IS. In order to store enough energy to provide an adequate boost voltage for the required time, the capacitance of capacitor 108, charged to 10 V, may easily be 20 μf or greater depending on the type of solenoid and the effort required of the solenoid. Disregarding all the other capacitors and voltages, this value alone does not meet with the IS voltage-capacitance limits shown in Table 1 above.

Another significant problem for an IS circuit is when two or more of the above cases (i.e., two or more voltages associated with capacitances) are present in the same circuit. This creates a multi-dimensional IS analysis. It is not possible, nor is it permitted, to justify such combinations by analysis under an IS standard. Instead, certifying agencies, such as Underwriters Laboratories (UL), Canadian Standards Association (CSA), or Committee for Electrotechnical Standardization (Cenelec), perform tests on these combinations using actual explosive mixtures of gases and producing sparks with faults introduced into the circuit. There is a much more significant cost and time burden associated with proving an IS design in this manner rather than by straightforward analysis based on an IS standard. This more complex testing scenario also leads to inefficient "trial and error" design/test cycles.

The conventional circuit 100 shown in FIG. 1 contains three voltages of 5V, 10V, and 15V (104, 106, and 114) and capacitances (118, 108, 120 and 122) at all three voltages. This design, by definition, must take the much more difficult testing route through IS certification. Although it is to be understood that conventional circuits may not be limited to the voltages shown in FIG. 1, any such arrangement of multiple voltages at multiple values, with various types of solenoids, will produce these same problems.

Figure 2:
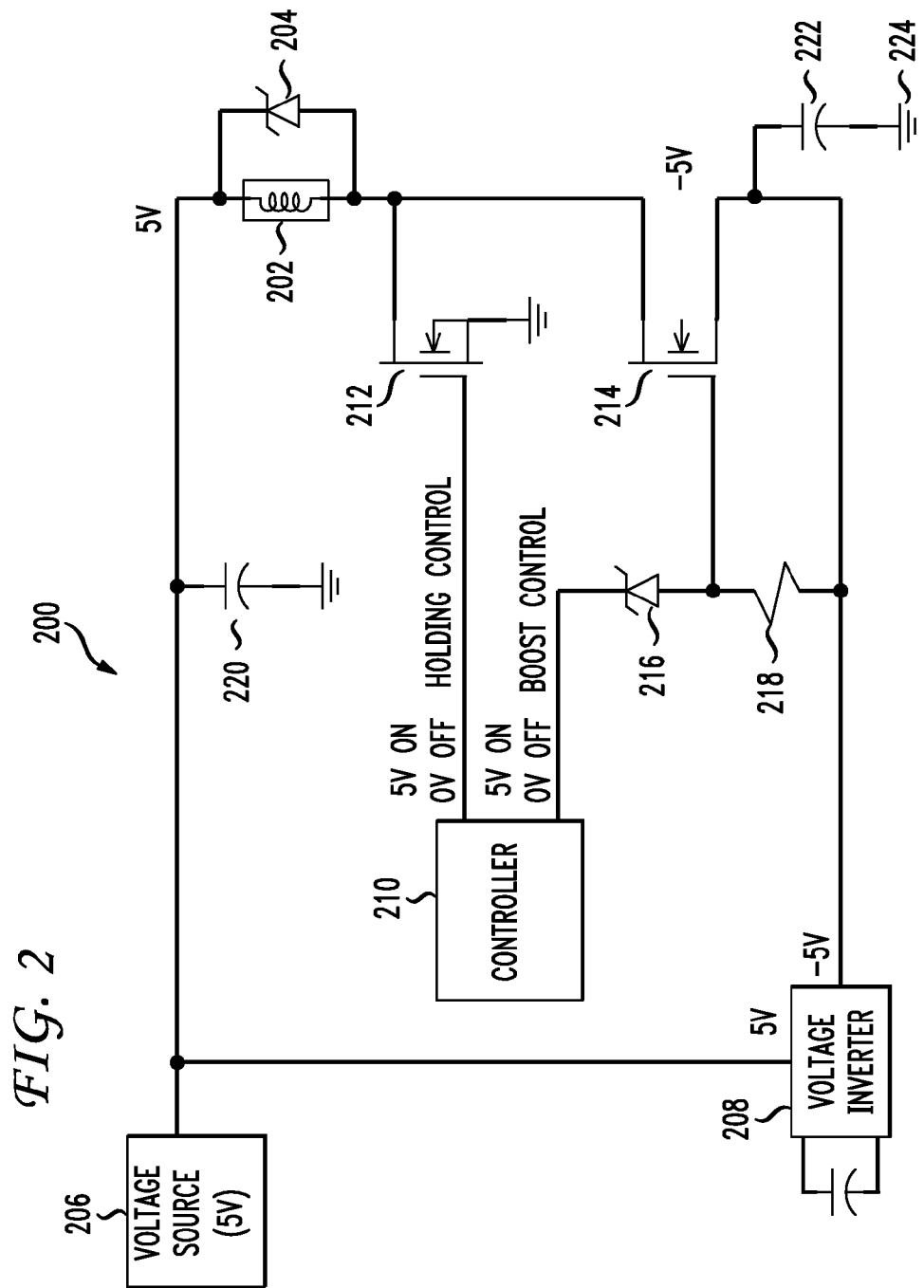
FIG. 2 illustrates a circuit for driving a solenoid valve according to an embodiment of the present invention.

Embodiments of the present invention overcome the above described problems with intrinsic safety in conventional circuits for driving a solenoid valve. FIG. 2 illustrates an IS circuit for driving a solenoid valve according to an embodiment of the present invention. The circuit 200 of FIG. 2 can be proven as IS by analysis under an IS standard, such as IEC 60079-11. One premise of IS certification is that the ground circuit is always "infallible". Accordingly, the IS equipment must be installed with certain measures to guarantee the infallible ground path. Therefore, the energy sources are always referenced to the ground potential when analyzed or when tested. An advantageous aspect to the design of circuit 200 of FIG. 2 is that circuit 200 uses more than one driving potential to drive the solenoid valve 202, but does not use large potentials with respect to ground.

As illustrated in FIG. 2, circuit 200 includes a solenoid 202. A zener diode 204 is connected in parallel with the solenoid valve 202 in order to protect the solenoid valve 202 by suppressing over-voltages applied to the solenoid valve 202. Although zener diode 204 is shown in FIG. 2, it is to be understood that other circuit components, such as an ordinary diode of sufficient voltage and current rating, can be used in place of zener diode 204. A voltage source 206 generates a voltage of 5V, which is stored by capacitor 220 and applied to a "high" side of the solenoid valve 202. The circuit 200 includes a voltage inverter 208 that is connected to voltage source 206 and generates a negative 5V potential from the 5V generated by voltage source 206. For example, the voltage inverter 208 can be implemented using an integrated circuit, such as an LTC1144 or the like. The −5V potential generated by the voltage inverter is stored by capacitor 222. Accordingly, the elements of circuit 200 are arranged such that −5V is generated with respect to ground 224.

In circuit 200, the "high" side of the solenoid valve 202 always sees 5V, however, the "low" side is controlled with boost and holding potentials based on boost and hold control signals from controller 210. According to an advantageous implementation, controller 210 may be implemented as a microprocessor, but the present invention is not limited thereto. The holding potential is accomplished by transistor 212 ("hold transistor") connecting the low side of the solenoid valve 202 to ground in response to a hold control signal from the controller 210. The boost potential comes in the form of a negative potential (−5V) briefly applied to the low side of the solenoid valve 202 by transistor 214 ("boost transistor") in response to a boost control signal from the controller 210. The controller 210 can utilize 0 to 5V digital circuits to generate the control signals. Accordingly, a hold control signal of 5V turns on the holding potential by controlling the hold transistor 212 to connect the low side of solenoid valve 202 to ground, and a hold control signal of 0V turns off the holding potential. Similarly, a boost control signal of 5V turns on the boosting potential by controlling the boosting transistor 214 to connect the −5V potential to the low side of the solenoid valve 202, and a boost control signal of 0V turns off the boost potential. Since 0 to 5V digital circuits are used as the control circuits, the arrangement of zener diode 216, resistor 218 and pull down transistor 214 form a simple level translation that does not interfere with the 5V digital interface and does not require additional cumbersome gate drive potentials. It can be noted that unlike in circuit 100 of FIG. 1, where a separate high side transistor drive voltage was required, transistors 212 and 214 of FIG. 2 are driven by simple 5V logic levels, which requires less circuitry and one less unique voltage, as opposed to the 15V gate drive potentials generated by the mosfet driver 114 in FIG. 1.

In order to actuate the solenoid valve 202, the hold transistor 212 and the boost transistor 214 are both turned on to apply +5V to the high side of the solenoid valve 202 and −5V to the low side of the solenoid valve 202, resulting in a 10V total boost voltage across the solenoid valve 202. Once the solenoid valve 202 has overcome the inertia of movement, the boost transistor is turned off so that only a 5V holding voltage is applied to the solenoid valve 202, thus reducing the power to approximately one fourth of the power used if the actuating potential were maintained at the solenoid.

Figure 3:
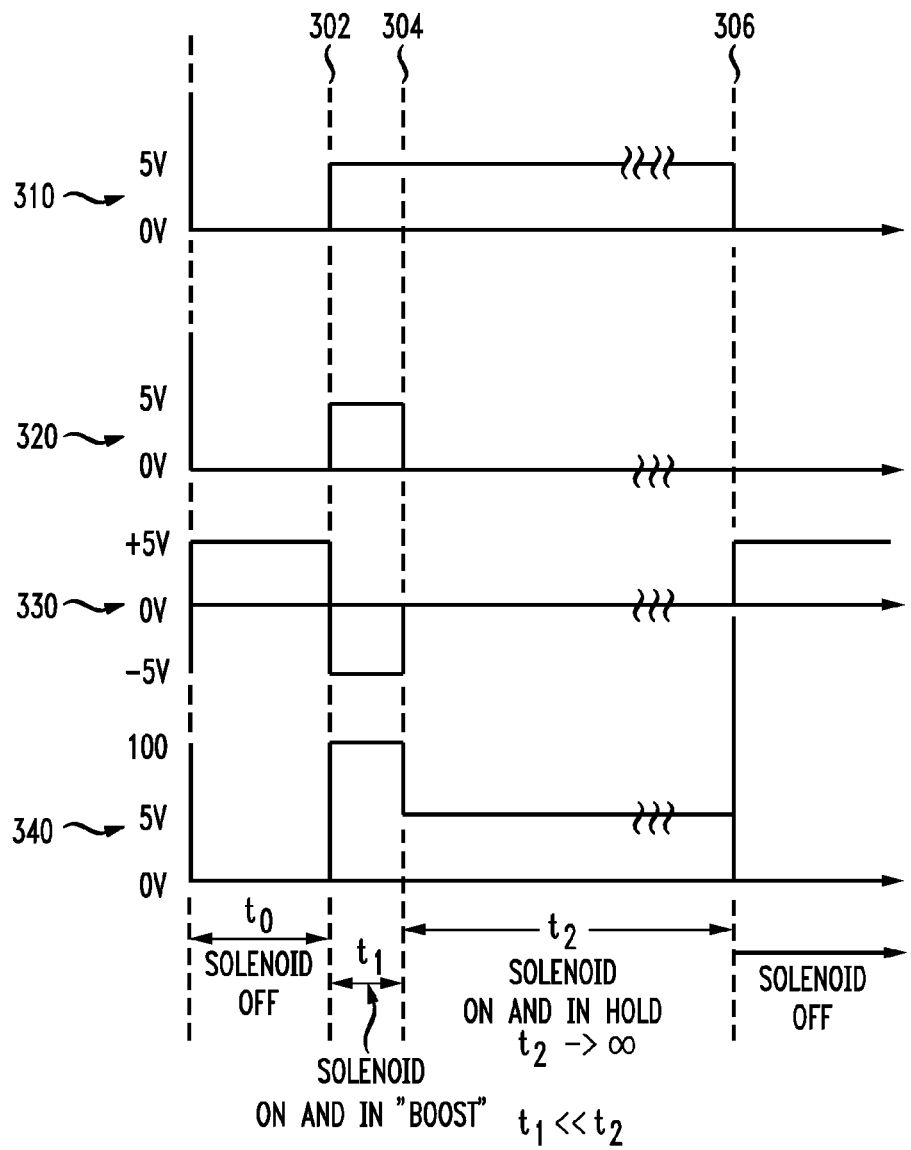
FIG. 3 illustrates voltages for driving the solenoid valve using the circuit of FIG. 2.

FIG. 3 illustrates voltages for driving the solenoid valve 202 of FIG. 2. FIG. 3 is described while referring to the circuit 200 of FIG. 2. As illustrated in FIG. 3, graph 310 shows the hold control voltage applied to the hold transistor 212, graph 320 shows the boost control voltage applied to the boost transistor 214, graph 330 shows the voltage at the low side of the solenoid valve 202, and graph 340 shows the total voltage applied to the solenoid valve 202. For the time period t0, the solenoid valve 202 is off. During this time period t0, no hold control voltage 310 is being applied to the hold transistor 212 and no boost control voltage 320 is being applied to the boost transistor 214. The high side of the solenoid valve 202 is connected to the 5V voltage source 206, but the low side of the solenoid valve 202 is not connected to ground during t0. This results in a voltage 330 at the low side of the solenoid valve 202 of 5V, and a total voltage 340 applied to the solenoid valve of 0V, thus the solenoid is not actuated. At 302, the hold control voltage 310 of 5V is applied to the hold transistor 212 and the boost control voltage 320 of 5V is applied to the boost transistor 214 in order to provide a boost voltage for a time period t1 to turn on or actuate the solenoid valve 202. This results in a voltage 330 of −5V at the low side of the solenoid valve, and a total voltage 340 of 10V applied to the solenoid valve 202 for the time period t1. At 304, the hold control voltage 310 is maintained at 5V and the boost control voltage 320 is turned off (0V) in order to hold the solenoid valve 202 turned on at steady state for time period t2. This results in a voltage 330 of 0V at the low side of the solenoid valve 202, and a total voltage 340 of 5V being applied to the solenoid valve, which holds the solenoid valve in an on position for time period t2, It can be noted that time period t1 may be much shorter than time period t2, as the boost voltage is only applied for an amount of time necessary to overcome momentum when actuating the solenoid valve. At 306, the hold control voltage 310 is shut off in order to turn off the solenoid valve 202, resulting in a total voltage 340 of 0V being applied to the solenoid valve 202.

As described above, the voltages of +5V and −5V in the circuit 200 of FIG. 2 still present a 10V total boost voltage to the solenoid valve 202, and a 5V holding voltage upon release of the boost voltage. For IS analysis, the fact that two voltages of opposite magnitude are present is inconsequential, given that both are referenced to the infallible ground circuit. Therefore, the absolute value of each voltage can be evaluated with respect to the IEC 60079-11 standard, as long as infallible grounding is provided to each capacitance element involved, This is especially beneficial where the magnitudes of the voltages are the same with respect to the safety ground, as shown in this example, for a magnitude of 5V. Accordingly, the circuit 200 of FIG. 2 can be analyzed under an IS standard to prove that the circuit 200 is IS. This allows circuit designers to easily ensure that such a circuit will be safe for use in a hazardous area.

Regarding capacitance in the circuit 200, there is a tradeoff that is needed, but it is an advantageous tradeoff. If in the circuit 100 of FIG. 1, 20 μf of capacitance at 10V is required for the boost voltage, then this can be related to a level of energy that is required to boost the solenoid. The potential drawback of having a +5V and −5V voltage supply (in circuit 200 of FIG. 2), instead of a total 10V supply (in circuit 100 of FIG. 1), is that from an AC or transient perspective, capacitors 220 and 222 are in series with a total of 10V across the series path while boosting the solenoid, whereas in circuit 100 of FIG. 1, capacitor 108 has all of 10V of charge. The net effect is that since capacitors 220 and 222 of FIG. 2 are in series with one another and the valve potential, in order to be equivalent to the capacitance of a single capacitor charged to 10V, capacitors 220 and 222 of FIG. 2 must each be two times the value of capacitors 108 or 118 of FIG. 1. Using above described example in which capacitor 108 of FIG. 1 has a capacitance of 20 µf, this means capacitors 220 and 222 of FIG. 2 each have a capacitance of 40 µf in order to match the level of energy required to boost the solenoid. Each of capacitors 220 and 222 having a capacitance of 40 µf results in a total of 80 µf at a magnitude of 5V (assuming +5V and −5V circuits, both referenced to ground a paralleled and evaluated as one lump sum capacitance at a magnitude of 5V). This may seem detrimental until referring to Table 1 above (or referring to an IS standard such as IEC 60079-11), which shows that decreases in voltage allow for large increases in capacitance which do not follow a linear relationship, but rather allow for multiples of additional capacitance when the voltage is simply cut in half from 10V to 5V. As shown in Table 1 above, the amount of capacitance needed for capacitors 220 and 222 in the above described example is well within the permissible capacitance at 5V, and there is no doubt that these requirements are met. Furthermore, this allows the circuit 200 to be proven as IS by analysis using just one low voltage magnitude and fitting within proven methods for establishing safe conditions, thus saving tremendous certification costs while ensuring that the circuit 200 is safe for use in a hazardous area.

The circuit 200 of FIG. 2 is an IS circuit for driving a solenoid valve. It is to be understood that in order to be IS, additional IS requirements must be followed in the design of the circuit according to a particular IS standard. For example certain circuit elements, such as the 5V voltage source 206 and the −5V voltage source (voltage inverter) 208, may be required to be physically spaced apart by a certain amount. Table 5 of the IEC 60079-11 standard establishes criteria for the minimum conductor clearance and creepage spacing between separate voltages, so as to not allow a fault connection between these voltages. In addition, it is to be understood that the circuit 200 of FIG. 2 is an IS circuit that may be implemented as part of a larger IS device or system. Furthermore, although the embodiment described in FIG. 2 uses certain values for voltages and capacitances, the present invention is not limited to these values.

Figure 4:
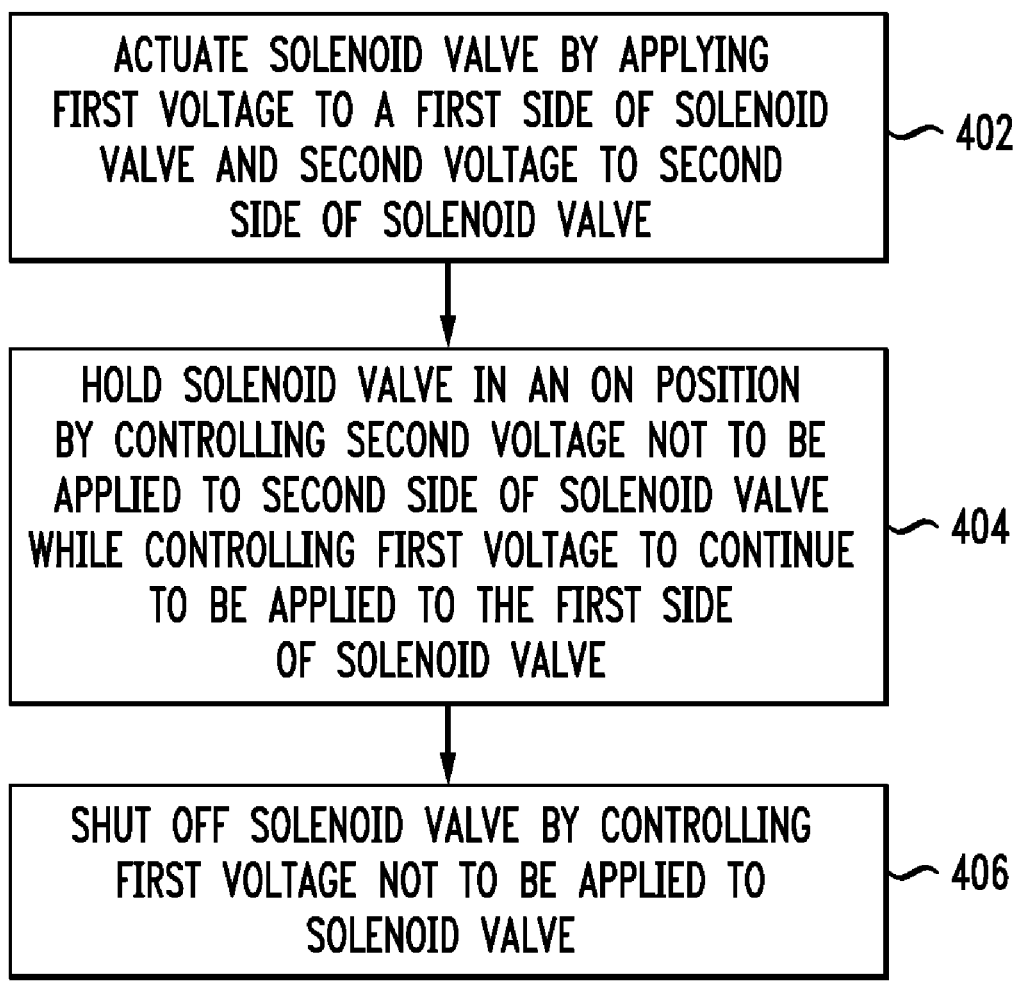
FIG. 4 is a flowchart illustrating a method for driving a solenoid valve according to an embodiment of the present invention.

FIG. 4 is a flowchart illustrating a method of driving a solenoid valve according to an embodiment of the present invention. The method of FIG. 4 may be performed by a circuit, such as circuit 200 of FIG. 2. At step 402, a solenoid valve is actuated by applying a first voltage to a first side of the solenoid valve and a second voltage to a second side of the solenoid valve. The second voltage is a voltage of opposite magnitude to the first voltage, so that the total voltage across the solenoid valve is twice the first voltage. The first voltage can be applied to a high side of the solenoid valve and the second voltage can be applied to a low side of the solenoid valve. The first and second voltages can be applied to the solenoid valve in response to first and second control signals from a controller. For example, in circuit 200 of FIG. 2, the hold control signal and the boost control signal from controller 210 respectively activate the hold transistor 212 and the boost transistor 214 to apply 5V to the high side of solenoid valve 202 and −5V to the low side of solenoid valve 202, for a total of 10V applied to solenoid valve 202.

At step 404, the solenoid valve is held in an on position by controlling the second voltage not to be applied to the second side of the solenoid valve while controlling the first voltage to continue to be applied to the first side of the solenoid valve. Accordingly, once the solenoid valve has been actuated and has overcome momentum, the voltage is reduced by removing the second voltage and maintaining the low side of the solenoid at ground potential. The second voltage can be controlled to no longer be applied to the solenoid valve in response to the release of the second control signal from the controller. When the second voltage is removed, the low side of the solenoid is instead applied to ground potential while the solenoid is on. For example, in circuit 200 of FIG. 2, the controller 210 shuts off the boost control signal in order to control the boost transistor 214 to disconnect the voltage inverter 208 (generating −5V) from the low side of the solenoid valve 202. The controller 210 maintains the hold control signal so that 5V is still applied to the solenoid valve 202 to keep the solenoid valve running at steady state.

At step 406, the solenoid valve is shut off by controlling the first voltage not to be applied to the solenoid valve. At this point, neither the first voltage nor the second voltage is applied to the solenoid valve. The first voltage is controlled to no longer be applied to the solenoid valve in response to the release of the first control signal from the controller. For example, in circuit 200 of FIG. 2, the controller 210 shuts off the hold control signal in order to control the hold transistor 212 to disconnect the low side of the solenoid valve 202 from the ground in order to stop the 5V from voltage source 206 from being applied across the solenoid valve 202.

As described above, the extra energy needed to for a conventional circuit to drive a solenoid makes it difficult for such a conventional circuit to be IS. In addition, conventional circuits used to drive a solenoid at a reduced power require complex testing to be certified as IS. Embodiments of the present invention described above provide a circuit that utilizes a reduced voltage, which allows the use of capacitance high enough to effectively overcome inertia and actuate a solenoid valve while still being compliant with IS standards. Also, embodiments of the present invention described above provide a circuit allows for higher power solenoids to comply with IS standards Further, embodiments of the present invention described above provide a circuit that is certifiable as IS without complex and expensive testing procedures.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus for driving a solenoid valve comprising:
   a solenoid valve;
   a voltage source connected to a first side of the solenoid valve and configured to generate a first voltage;
   a voltage inverter connected to the voltage source and configured to generate a second voltage from the first voltage, wherein the second voltage is of opposite magnitude to the first voltage; and
   a controller configured to selectively control the first voltage to be applied to the first side of the solenoid valve and the second voltage to be applied to a second side of the solenoid valve.

2. The apparatus of claim 1, further comprising:
   a first transistor configured to connect the second side of the solenoid valve to a ground in response to a first control signal from the controller to apply the first voltage to the solenoid valve; and
   a second transistor configured to connect the second side of the solenoid valve to the voltage inverter in response to a second control signal from the controller to apply the second voltage to the solenoid valve.

3. The apparatus of claim 2, wherein the first side of the solenoid valve is a high side of the solenoid valve and the second of the solenoid valve is a low side of the solenoid valve.

4. The apparatus of claim 1, wherein the controller is configured to control the first voltage to be applied to the first side of the solenoid valve and the second voltage to be applied to the second side of the solenoid valve to actuate the solenoid valve.

5. The apparatus of claim 4, wherein the controller is configured to control the first voltage to continue to be applied to the solenoid valve and to control the second voltage not to be applied to the solenoid valve after the solenoid valve has been actuated to hold the solenoid valve in an on position.

6. The method of claim 4, wherein a total voltage applied to the solenoid valve when the first and second voltages are applied to the first and second sides of the solenoid valve, respectively, is a multiple of the first voltage.

7. The apparatus of claim 1, further comprising:
a first capacitor connected between the voltage source and the first side of the solenoid valve; and
a second capacitor connected between the voltage inverter and the second side of the solenoid valve.

8. The apparatus of claim 7, wherein a capacitance of the first and second capacitors is less than a capacitance limit corresponding to the first voltage according to an intrinsic safety standard.

9. The apparatus of claim 8, wherein said intrinsic safety standard is IEC 60079-11.

10. The apparatus of claim 1, wherein said apparatus is intrinsically safe (IS) according to an intrinsic safety standard.

11. The apparatus of claim 1, wherein said controller comprises a microprocessor.

12. A method for driving a solenoid valve, comprising:
actuating the solenoid valve by controlling a first voltage to be applied to a first side of the solenoid valve and controlling a second voltage to be applied to a second side of the solenoid valve, wherein the second voltage is of opposite magnitude to the first voltage;
holding the solenoid valve in an on position by controlling the first voltage to continue to be applied to the solenoid valve and controlling the second voltage to not be applied to the second side of the solenoid valve;
wherein the first voltage is generated by a voltage source and the second voltage is generated from the first voltage by a voltage inverter connected to the voltage source.

13. The method of claim 12, said step of actuating the solenoid valve by controlling a first voltage to be applied to a first side of the solenoid valve and controlling a second voltage to be applied to a second side of the solenoid valve comprises:
controlling a first transistor to connect the second side of the solenoid valve to a ground to apply the first voltage to the first side of the solenoid valve; and
controlling a second transistor to connect the second voltage to the second side of the solenoid valve.

14. The method of claim 13, wherein said step of controlling the second voltage to not be applied to the second side of the solenoid valve comprises:
controlling the second transistor to disconnect the second voltage from the second side of the solenoid valve.

15. The method of claim 14, further comprising:
turning off the solenoid valve by controlling the first transistor to disconnect the second side of the solenoid valve from the ground.

16. The method of claim 15, wherein the first and second transistors are controlled by transmitting control voltages to the first and second transistors.

17. The method of claim 13, wherein the first side of the solenoid valve is a high side of the solenoid valve and the second of the solenoid valve is a low side of the solenoid valve.

18. An apparatus for driving a solenoid valve comprising:
means for actuating the solenoid valve by controlling a first voltage to be applied to a first side of the solenoid valve and controlling a second voltage to be applied to a second side of the solenoid valve, wherein the second voltage is of opposite magnitude to the first voltage;
means for holding the solenoid valve in an on position by controlling the first voltage to continue to be applied to the solenoid valve and controlling the second voltage to not be applied to the second side of the solenoid valve;
means for generating the first voltage; and
means for generating the second voltage by inverting the first voltage.

19. The apparatus of claim 18, said means for actuating the solenoid valve by controlling a first voltage to be applied to a first side of the solenoid valve and controlling a second voltage to be applied to a second side of the solenoid valve comprises:
means for controlling a first transistor to connect the second side of the solenoid valve to a ground to apply the first voltage to the first side of the solenoid valve; and
means for controlling a second transistor to connect the second voltage to the second side of the solenoid valve.

20. The apparatus of claim 19, wherein said means for holding the solenoid valve in an on position by controlling the first voltage to continue to be applied to the solenoid valve and controlling the second voltage to not be applied to the second side of the solenoid valve comprises:
means for controlling the second transistor to disconnect the second voltage from the second side of the solenoid valve.

21. The apparatus of claim 20, further comprising:
means for turning off the solenoid valve by controlling the first transistor to disconnect the second side of the solenoid valve from the ground.

22. The apparatus of claim 19, wherein the first side of the solenoid valve is a high side of the solenoid valve and the second of the solenoid valve is a low side of the solenoid valve.

* * * * *